(No Model.)

J. T. WILSON & G. W. MORRIS.
CAR BOLSTER.

No. 553,377. Patented Jan. 21, 1896.

Witnesses.
Chas. J. Farrar.
Walter Famariss

Inventors
John T. Wilson
and George W. Morris
By Kay & Totten
Attorneys.

UNITED STATES PATENT OFFICE.

JOHN T. WILSON AND GEORGE W. MORRIS, OF PITTSBURG, PENNSYLVANIA.

CAR-BOLSTER.

SPECIFICATION forming part of Letters Patent No. 553,377, dated January 21, 1896.

Application filed October 26, 1895. Serial No. 567,044. (No model.)

*To all whom it may concern:*

Be it known that we, JOHN T. WILSON and GEORGE W. MORRIS, residents of Pittsburg, in the county of Allegheny and State of Pennsylvania, have invented a new and useful Improvement in Car-Bolsters; and we do hereby declare the following to be a full, clear, and exact description thereof.

Our invention relates to car-bolsters—that is, to the bolsters connecting the truck and car-body—these bolsters being generally known as "body-bolsters" and "truck-bolsters."

The object of the invention is to provide a simple and strong form of bolster, free from riveted parts (which are liable to get out of order) and light in weight, while so braced to be sufficiently strong and rigid for all necessary purposes.

To these ends our invention comprises, generally stated, a car-bolster (either body or truck bolster) formed of a wrought-metal plate having the center bearing forged therein and integral therewith, and having inclined arms extending back from the center bearing, in combination with a tension-bar fitting over the plate and having end ribs contacting with the outer ends of the plate to brace the same, the plate being preferably formed with bent portions extending forward from the inclined arms to form side-bearings for the bolster, and the tension-bar having projections forged therefrom and fitting the depressions on the reverse faces of the side bearings to support the same.

To enable others skilled in the art to make and use our invention we will describe the same more fully, referring to the accompanying drawings, in which—

Figure 1:
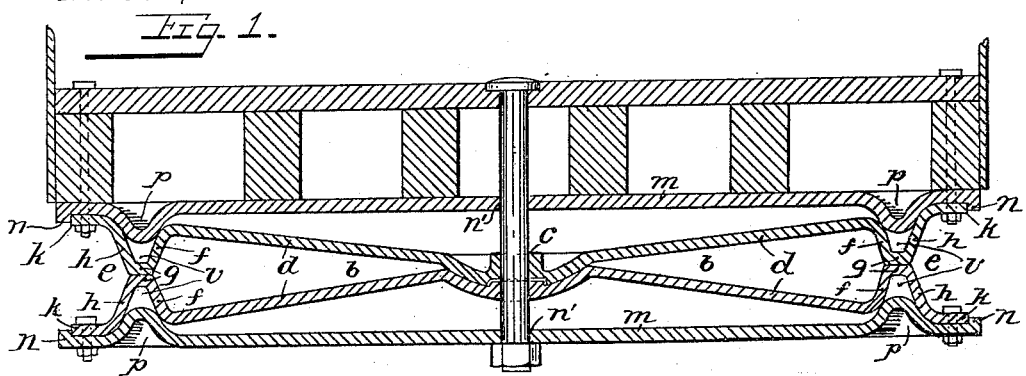
Figure 2:
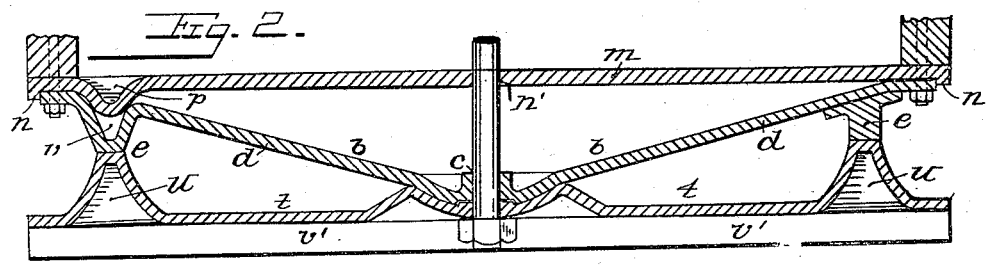
Figure 3:
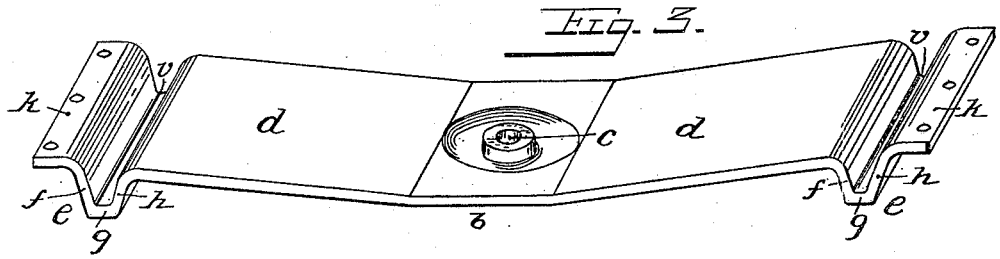
Figure 4:
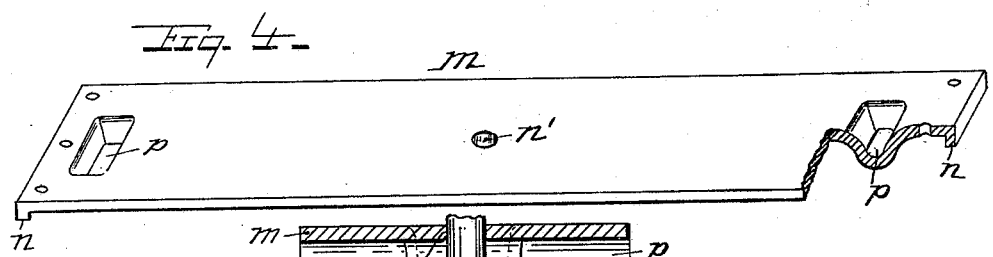
Figure 5:
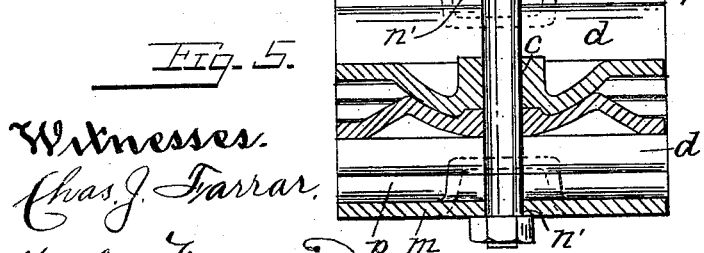

Figure 1 is a sectional view of the lower portion of a car-body and the body and truck bolsters, showing both bolsters of a construction embodying the invention. Fig. 2 is a cross-section showing the upper or car bolster of a construction embodying the invention. Fig. 3 is a perspective view of the bolster plate or body. Fig. 4 is a like view of the tension-bar; and Fig. 5 is a cross-section through the line 5 5, Fig. 1.

Like letters of reference indicate like parts in each figure.

The bolsters may be employed with any suitable form of car-body, being illustrated in connection with the base of an ordinary freight-car to which the body-bolster is secured. In Fig. 1 both the body-bolster and the truck-bolster are of the same construction and the description given will apply to each. The bolster-plate $b$ has the center bearing $c$, which is forged therein and made in any desired shape, the forged center bearing being thus integral with the bolster-plate, so that it has the full strength of the plate and there are no riveted parts to become loose and get out of order. Extending backwardly from the center bearing $c$ are the inclined arms $d$, which in the preferred form, which is illustrated in the drawings, extend back to the side bearings $e$. These side bearings are formed by the bending of the plate itself, first forwardly from the inclined arms, as at $f$, and thence outwardly to form the bearing-faces $g$, and thence backwardly, as at $h$, while beyond the side bearings so formed is the outwardly-projecting portion $k$ provided with suitable bolt-holes through which the bolts connecting the bolster and the car or truck pass. To support and properly brace the bolster-body so formed, we employ the tension-bar $m$, which has the end ribs $n$ projecting downwardly over the ends of the bolster-body, so as to confine and brace the same, the tension-bar having suitable bolt-holes in line with those of the bolster-body for the passage of the bolts connecting it to the car-body or truck.

Where the inclined arms of the bolster-body have the side bearings formed by the bending of the plate, as above described, in order to properly brace the bolster-body at such point of bending and prevent that portion of the bolster-body from bending in and closing up under the strain brought upon the bolster, we forge in the body of the tension-bar the projections $p$ in line with the side bearings and in such position as to enter within the recesses $v$, formed in the reverse face of the bolster-body where the side bearings are formed, and so bracing the bolster-body at these points.

The king-bolt generally extends through openings $n'$ in the tension-bars and through the center bearings $c$ in the bolster-bodies, so providing for the mounting of the truck-bolster and body-bolster together.

While we prefer to employ both body and truck bolsters in the construction above described, we may form either the body-bolster or the truck-bolster of such construction, employing any other suitable construction for the other bolster. In Fig. 2 we have shown the body-bolster of such construction and the truck-bolster of a single plate $t$, in which the center bearing is forged and from which the side bearings $u$ are forged, this plate having, if desired, side ribs $v'$, or being of any desired construction. In said figure at one side of the bolster-body embodying the present invention it will be seen that we have carried the backwardly-inclined arm $d$ up to the end rib of the tension-bar without bending the side bearing therefrom, the side bearing being a separate piece secured to the bolster-body. Such construction may be employed if desired, and it is illustrated in the drawings to show one way in which the invention may be employed.

When our improved bolster is in use the body-bolster is secured to the car, the two parts—i. e., the bolster-body and the tension-bar—being secured to the car by the bolts passing through the car-body, and the truck-bolster is mounted upon the truck in any suitable way, the two parts forming the same—that is, the bolster-body and the tension-bar—being secured together by bolts or rivets or as part of the mounting of the bolster upon the truck, as may be found most desirable. The bolster as so made is of light weight and can be rapidly formed at small cost, while it has no parts which are liable to become loose under the jar to which such bolsters are subjected, and through the bracing of the bolster-body by the tension-bar a rigid and strong construction of bolster is obtained.

What we claim as our invention, and desire to secure by Letters Patent, is—

1. A car bolster formed of a wrought metal plate having the center bearing forged therein and integral therewith, and inclined arms extending back from the center bearing, in combination with a tension-bar fitting over the plate and having end ribs contacting with the outer ends thereof, substantially as set forth.

2. A car bolster formed of a wrought metal plate having a center bearing forged therein and integral therewith, and inclined arms extending back from the center bearing, and having said arms bent forward to form side bearings, in combination with a tension bar fitting over the plate and so secured to the plate as to brace the same, substantially as set forth.

3. A car bolster formed of a wrought metal plate having the center bearing forged therein and integral therewith, and inclined arms extending back from the center bearing, and having said arms bent forward to form side bearings, in combination with a tension bar fitting against the plate and having projections formed therein and entering the depressions in the side bearings, and so secured to the plate as to brace the same, substantially as set forth.

In testimony whereof we, the said JOHN T. WILSON and GEORGE W. MORRIS, have hereunto set our hands.

JOHN T. WILSON.
GEORGE W. MORRIS.

Witnesses:
 JAMES I. KAY,
 ROBERT C. TOTTEN.